United States Patent
Osaka et al.

[19]

[11] Patent Number: 6,105,480

[45] Date of Patent: *Aug. 22, 2000

[54] APPARATUS FOR SEPARATING RIBBON-COATED MULTICORE OPTICAL FIBER

[75] Inventors: Keiji Osaka, Yokohama; Hideyuki Iwata, Mito, both of Japan

[73] Assignees: Sumitomo Electric Industries, Ltd., Osaka; Nippon Telegraph and Telephone Corporation, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,886

[22] Filed: Mar. 5, 1997

[30] Foreign Application Priority Data

Mar. 6, 1996 [JP] Japan .................................. 8-049361

[51] Int. Cl.[7] .............................. H02G 1/00; B26D 1/03; B26D 1/04
[52] U.S. Cl. ................................ 83/444; 83/448; 83/564; 83/588; 83/620; 83/694; 83/695; 83/858; 83/947; 30/90.4; 385/134
[58] Field of Search .................................. 83/425, 425.2, 83/694, 569, 924, 927, 425.1, 425.3, 438, 440, 440.1, 444, 448–450, 563, 564, 574, 588, 589, 618, 620, 695, 856, 858; 30/90.4, 279.2, 90.8, 90.9, 91.1; 385/134

[56] References Cited

U.S. PATENT DOCUMENTS

| | | | |
|---|---|---|---|
| 3,543,616 | 12/1970 | Bradley | 30/30.9 |
| 4,025,998 | 5/1977 | Eppler | 30/90.8 X |
| 4,046,045 | 9/1977 | Stevens | 83/947 X |
| 4,179,964 | 12/1979 | Kirkgasser et al. | 83/947 X |
| 4,230,008 | 10/1980 | Fornwalt et al. | 83/620 X |
| 4,275,630 | 6/1981 | Goldsmith et al. | 81/9.51 X |
| 4,276,798 | 7/1981 | Gottschalk | 81/9.51 X |
| 4,476,628 | 10/1984 | Kees, Jr. | 81/9.51 X |
| 4,979,413 | 12/1990 | Beller | 83/856 X |
| 5,524,166 | 6/1996 | Osaka et al. | 385/134 |

FOREIGN PATENT DOCUMENTS

| | | |
|---|---|---|
| 0650237 | 4/1995 | European Pat. Off. . |
| 56-6202 | 1/1981 | Japan . |
| 03102303 | 4/1991 | Japan . |
| 08005843 | 1/1996 | Japan . |

*Primary Examiner*—Clark F. Dexter
*Attorney, Agent, or Firm*—Pillsbury Madison & Sutro LLP

[57] ABSTRACT

An apparatus for separating a ribbon-coated multicore optical fiber at a plurality of positions at once, wherein the ribbon-coated multicore optical fiber includes a number of single-core fibers arranged in parallel. This apparatus comprises a first cutting member in which a plurality of sets of arc faces opposed to each other by way of a through path for inserting the ribbon-coated multicore optical fiber are disposed along the through path, while the arc faces in the respective sets extend from one side section of the through path halfway through the width direction of the through path; a second cutting member having a plurality of arc faces which continuously extend to and are adapted to join with the respective arc faces of the first cutting member in the width direction of the through path; and guide members which are respectively disposed at both end positions of the through path so as to position the ribbon-coated multicore optical fiber inserted into the through path. The first and second cutting members are movable relative to each other in the direction in which the arc faces are opposed to each other.

22 Claims, 4 Drawing Sheets

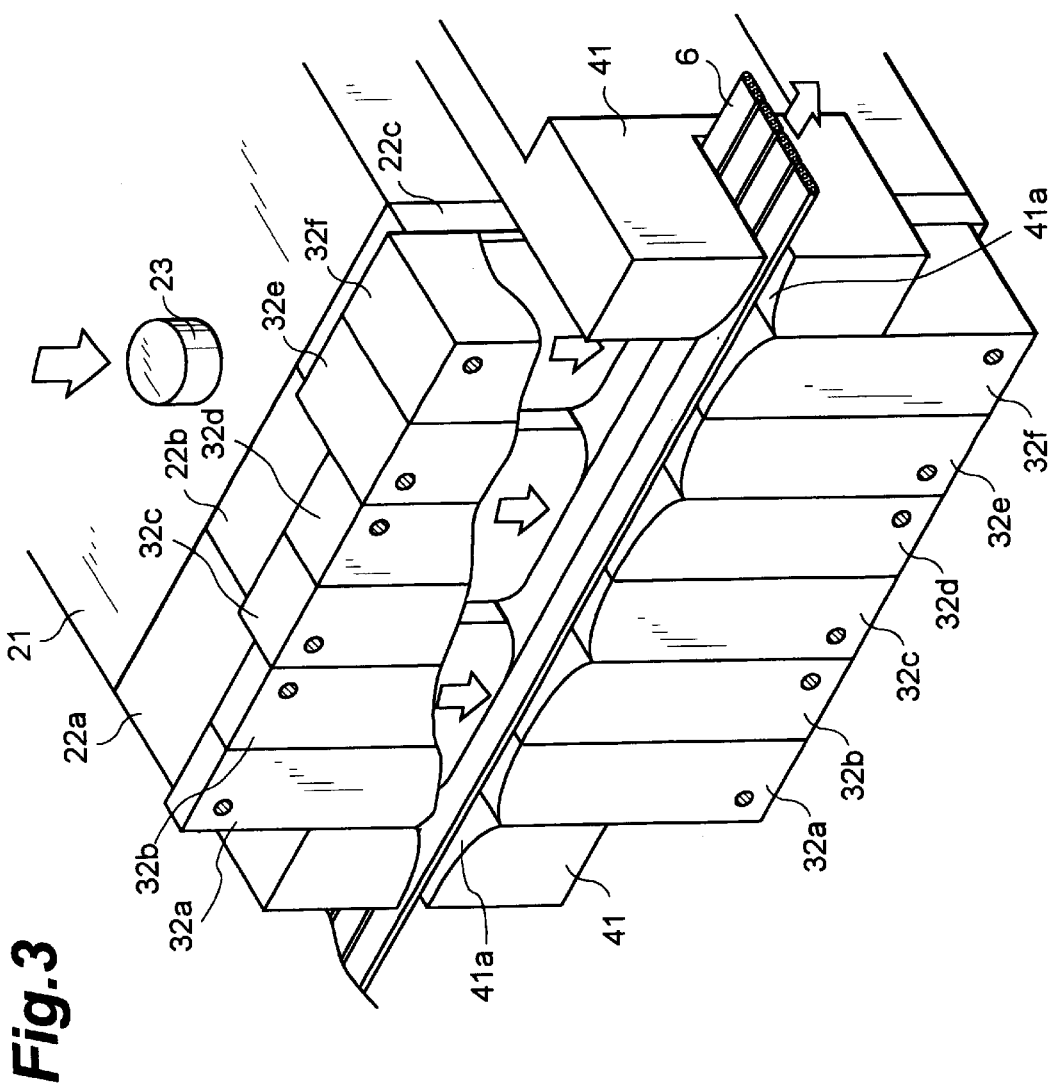

| SEPARATION MODE [NUMBER OF CORES] | CLOSED LID |
|---|---|
| ① 4+4+4+4 | A, B, C |
| ② 4+12 | A |
| ③ 8+8 | B |
| ④ 12+4 | C |
| ⑤ 4+4+8 | A, B |
| ⑥ 4+8+4 | A, C |
| ⑦ 8+4+4 | B, C |

(A : 31a, 31b
 B : 31c, 31d
 C : 31e, 31f)

APPARATUS FOR SEPARATING RIBBON-COATED MULTICORE OPTICAL FIBER

BACKGROUND OF THE INVENTION

1. Field of the Invention

The present invention relates to an apparatus for separating a ribbon-coated multicore optical fiber having a plurality of fiber strands into a plurality of fibers.

2. Related Background Art

As optical fiber cables have a larger number of cores therein, there has been increasing demand for a ribbon-coated multicore optical fiber in which a plurality of fiber strands are arranged in a flat shape and integrated together. In order to improve its handling when being disposed within an optical fiber cable, for example, such a ribbon-coated multicore optical fiber has an increased number of strands within the coated fiber and is branched at an end portion of the optical fiber cable and also at the middle of the cable so as to be used as being connected to a multicore ribbon-coated optical fiber having a small number of strands or to a single-core fiber. For example, a plurality of conventional ribbon-coated 4-core optical fibers (in which 4 strands are arranged) or ribbon-coated 12-core optical fibers have been connected in parallel to each other to form ribbon-coated 8-core or 24-core optical fibers. When these ribbon-coated 8-core or 24-core optical fibers are employed, a separating apparatus is used for branching and connecting them. It is desirable for this separating apparatus to cause no damage to the ribbon-coated optical fibers and exert no influence (no increased loss) upon transmitted light even under active or actually transmitted state (in which light is transmitted therethrough).

Known as such a separating apparatus is that disclosed in Japanese Patent Application Laid-Open No. 3-102303. Namely, this apparatus for separating (or tool for dividing) a ribbon-coated multicore optical fiber is a tool for splitting the ribbon-coated multicore optical fiber in a longitudinal direction so as to separate a predetermined length of a terminal section or middle section thereof into a single-core optical fiber or a plurality of multicore optical fibers. It is equipped with a cutting member composed of two sets of arc plates. While holding a ribbon-coated multicore optical fiber, the cutting member is relatively moved so as to shear the ribbon-coated multicore optical fiber. In this state, the apparatus is moved in the longitudinal direction of the ribbon-coated multicore optical fiber so as to split the latter.

SUMMARY OF THE INVENTION

It is an object of the present invention to provide an apparatus for separating a ribbon-coated multicore optical fiber, which can separate the fiber at a plurality of positions at once and is excellent in its separating operation.

The present invention provides an apparatus for separating a ribbon-coated multicore optical fiber, in which a number of single-core fibers are arranged in parallel, into a plurality of fibers. This apparatus comprises a first cutting member in which a plurality of sets of arc faces opposed to each other by way of a through path for inserting the ribbon-coated multicore optical fiber are disposed along the through path, while the arc faces in the respective sets extend from one side section of the through path to different positions halfway through the width direction of the through path; a second cutting member having a plurality of arc faces which continuously extend to the respective arc faces of the first cutting member in the width direction of the through path; and guide members which are respectively disposed at both end positions of the through path so as to position the ribbon-coated multicore optical fiber inserted into the through path. The first and second cutting members are relatively movable to each other in the direction of thickness of the ribbon-coated multicore optical fiber in which the arc faces are opposed to each other.

In accordance with the present invention, when the first and second cutting members are relatively moved with respect to each other while a ribbon-coated multicore optical fiber to be separated is inserted into the through path, the ribbon-coated multicore optical fiber is sheared at the position of each arc face. When the separating apparatus is slid along the ribbon-coated multicore optical fiber, the ribbon-coated multicore optical fiber is separated into sets of a plurality of fibers along its longitudinal direction.

Preferably, in another aspect of the present invention, the first and second cutting members are adapted to join together and separate from each other at least in each set of arc faces opposed to each other.

In accordance with this aspect of the present invention, when the joining and separating states of the respective arc faces are changed, it can be arbitrarily set whether the ribbon-coated multicore optical fiber is sheared or not at the respective shearing positions. Consequently, the mode of separation can be changed as required.

In still another aspect of the present invention, each of the above-mentioned guide members comprises a slit, which has a cross section substantially the same as that of the ribbon-coated multicore optical fiber and opens at an extension of the through path, and a guide lid which opens and closes one side of the slit independently of the first and second cutting members.

In accordance with this aspect of the present invention, the ribbon-coated multicore optical fiber to be separated is securely positioned within the slit, whereby its separating positions are prevented from shifting sidewise.

Preferably, in a further aspect of the present invention, the first cutting member is attached to a frame so as to be movable toward the direction in which the arc faces are opposed to each other, while the second cutting member is pivotally attached to the frame by means of a shaft so as to be adapted to join with and separate from the first cutting member as it swings around the shaft.

In accordance with this aspect of the present invention, the arc faces can easily be joined together and separated from each other in the first and second cutting members.

In a still further aspect of the present invention, a pin is projected from one of the first and second cutting members, whereas a hole for inserting the pin when the first and second cutting members are joined together is bored in the other.

In accordance with this aspect of the present invention, the first and second cutting members are joined together at a correct position when the pin is inserted into the hole, and the first and second cutting members joined together are prevented from shifting to each other when the ribbon-coated multicore optical fiber is separated.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is an explanatory view showing a separating process according to the apparatus for separating a ribbon-coated multicore optical fiber;

DESCRIPTION OF THE PREFERRED EMBODIMENTS

Figure 2:
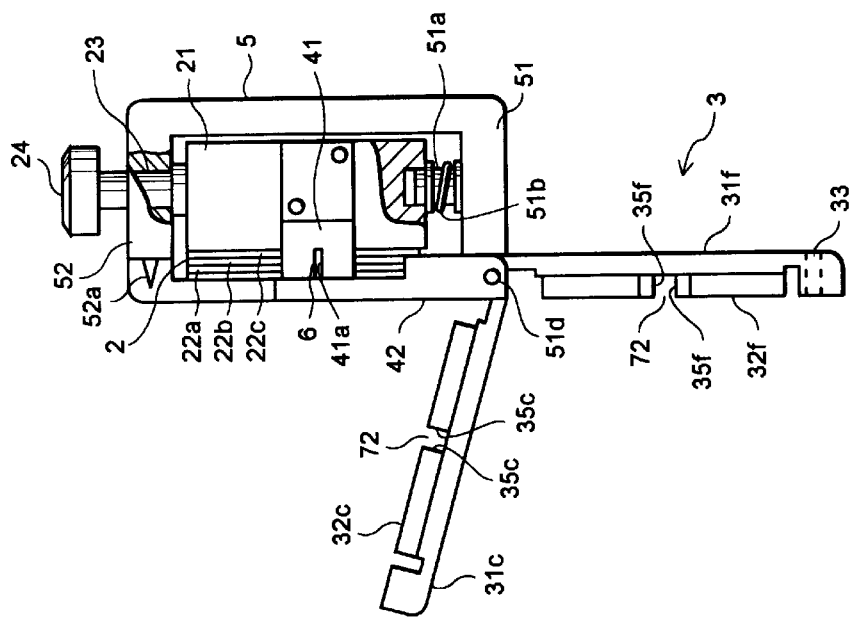
FIG. 2 is a side view showing the apparatus for separating a ribbon-coated multicore optical fiber.

In the conventional apparatus for separating (or tool for dividing) a ribbon-coated multicore optical fiber, since it can separate the ribbon-coated multicore optical fiber only at one position, an additional separating apparatus or process is necessary for separating the fiber at a different position. Also, even in the case where the additional separating apparatus is prepared, when separating one ribbon-coated multicore optical fiber into a plurality of fibers, only one position can be separated in a single separating operation. Accordingly, it is necessary for the separating operation to be repeated as many times as the number by which the ribbon-coated multicore optical fiber is to be divided. Consequently, the operation for separating the ribbon-coated multicore optical fiber is time-consuming, thereby yielding a very low working efficiency.

In the following, embodiments in accordance with the present invention will be explained with reference to attached drawings. In the drawings, elements identical to each other will be referred to with marks identical to each other, without their overlapping explanations repeated.

EMBODIMENT 1

Figure 1:
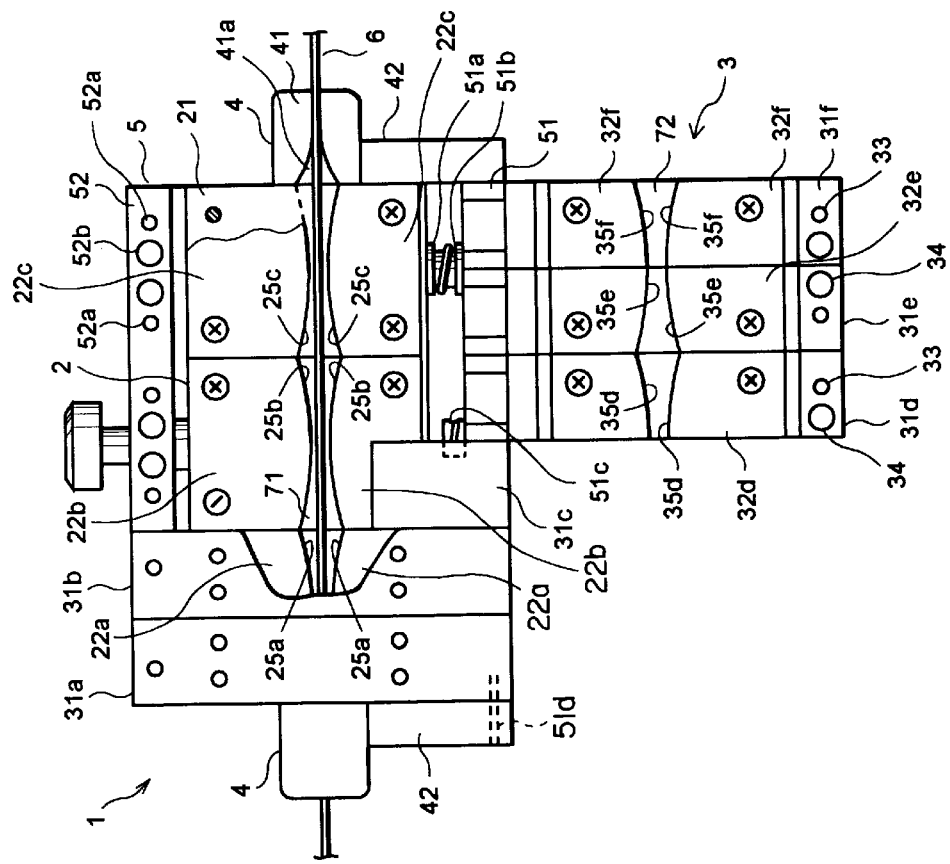
FIG. 1 is a front view showing an apparatus for separating a ribbon-coated multicore optical fiber.

FIG. 1 is a front view showing an apparatus for separating a ribbon-coated multicore optical fiber, whereas FIG. 2 is a side view thereof. As shown in FIGS. 1 and 2, a separating apparatus 1 for a ribbon-coated multicore optical fiber comprises a first cutting member 2, a second cutting member 3, and guide members 4. The first cutting member 2 has a plurality of moving members in the form of arc plates 22a, 22b, 22c attached to one surface of a substrate 21. The arc plates 22 are disposed such that their protruded arc faces 25a, 25b, 25c are opposed to each other by way of a through path 71 for inserting a ribbon-coated multicore optical fiber 6 to be separated. A plurality of sets of arc plates 22 are disposed in parallel along the through path 71. For example, three sets of arc plates 22a, 22b, and 22c each composed of two arc plates are attached to the substrate 21 along the longitudinal direction thereof, while pairs of arc faces 25a to 25c respectively formed at end faces of the corresponding arc plates 22a to 22c are opposed to each other. The through path 71 for inserting the ribbon-coated multicore optical fiber 6 is formed between these opposed pairs of the arc faces 25a to 25c. Though the arc plates 22 each having an arc face are attached to the first cutting member 2 in this embodiment, plates having other kinds of curved faces may be attached thereto.

Also, as the respective arc plates 22 have different sizes in terms of thickness, the respective arc faces 25 are formed at positions differently distanced from the substrate 21. As the respective pairs of opposed arc plates 22 have different thickness values, the ribbon-coated multicore optical fiber 6 can be sheared and separated along its longitudinal direction. For example, the thickness values of the arc plates 22a, 22b, and 22c are set to about ¼, ²⁄₄, and ¾ of the width of the ribbon-coated multicore optical fiber 6, whereby the arc faces 25a, 25b, and 25c are formed at positions respectively corresponding to about ¼, ²⁄₄, and ¾ of the width of the ribbon-coated multicore optical fiber 6. As the ribbon-coated multicore optical fiber 6 is sheared by corner edge portions of the respective arc faces 25a to 25c, the ribbon-coated multicore optical fiber 6 is divided into four. In cases where these arc plates 22a to 22c are detachably attached to the substrate 21 by means of screws or the like, they can be easily repaired, while allowing the separating width of the ribbon-coated multicore optical fiber 6 to be set variably.

As shown in FIGS. 1 and 2, the substrate 21 for the first cutting member 2 is disposed within a frame 5 having a C-shaped cross section so as to be movable along a direction connecting opposed walls 51 and 52 of the frame 5. Namely, the substrate 21 for the first cutting member 2 is disposed such that each arc plate 22 faces the open portion of the frame 5 while the through path 71 is exposed. A support shaft 51a projecting from the wall 51 is inserted into the substrate 21 for the cutting member 2, while a stepped shaft 23 projecting from a face of the substrate 21 opposed to the wall 52 penetrates into the latter, whereby the substrate 21 is movable along the axial direction of the support shaft 51a and stepped shaft 23. Also, a spring 51b is disposed around the support shaft 51a as being compressed between the wall 51 and the substrate 21, thereby urging the substrate 21 toward the wall 52. Consequently, the substrate 21 is usually moved toward the wall 52 due to the urging force of the spring 51b. When a button 24 at the tip of the stepped shaft 23 is pushed, the substrate 21 is moved toward the wall 51 by means of the stepped shaft 23. Also, a stopper 51c inwardly projects from the wall 51 so as to limit the amount of movement of the substrate 21 toward the wall 51. Desirably, the stopper 51c is constituted by a screw or the like such that the amount of movement of the substrate 21 can be adjusted as the length of projection of the stopper 51c is changed.

On the other hand, the second cutting member 3 is detachably attached to the first cutting member 2. For example, as shown in FIGS. 1 and 2, the second cutting member 3 comprises a lid 31 pivotally attached to an end portion of the wall 51 of the frame 5 and a plurality of holding members in the form of arc plates 32a to 32f attached to the inner face of the lid 31. As the lid 31 swings, the open portion of the frame 5 is opened and closed, whereby the arc plates 22 of the first cutting member 2 and the arc plates 32 join together or separate from each other. The lid 31 comprises a plurality of divisions each of which is pivotally attached to an axial pin 51*d* which is disposed along the end portion of the wall 51, whereby these divisions of the lid 31 can independently swing around the axial pin 51*d*. Though the arc plates 32 each having an arc face 35 are attached to the second cutting member 3 in this embodiment, plates having other kinds of curved faces may be attached thereto.

Also, as shown in FIGS. 1 and 2, the lid 31 is divided into six lid members 31*a* to 31*f* such that two of them join with one arc plate 22 of the first cutting member 2 when the lid 31 swings toward the frame 5 to close the latter. As two lid members of the lid 31 join with one arc plate 22 of the first cutting member 2, when the lid 31 is moved toward the first cutting member 2 so as to join with the latter after the ribbon-coated multicore optical fiber 6 to be separated is inserted into the through path 71 in the first cutting member 2, the ribbon-coated multicore optical fiber 6 is prevented from being jammed between the first cutting member 2 (arc plate 22) and the second cutting member 3 (arc plate 32).

Also, pairs of arc plates 32*a* to 32*f*, each plate of which has a shape obtained when the arc plate 22 is divided into two, are attached to the respective lid members 31*a* to 31*f* so as to exactly overlap with the arc plates 22. Namely, in the arc plate pairs 32*a* to 32*f*, respective pairs of protruded arc faces 35*a* to 35*f* are opposed to each other. Between these pairs of the arc faces 35*a* to 35*f*, a through path 72 is formed. As the lid 31 is closed, the arc plates 32 join with the arc plates 22 of the first cutting member 2, whereby the through path 71 in the first cutting member 2 and the through path 72 in the second cutting member 3 continue to each other. As a result, a through path having a width substantially the same as that of the ribbon-coated multicore optical fiber 6 is formed. Here, as shown in FIG. 3 or FIGS. 4, 5 and 6, the thickness values of the arc plates 32*a* to 32*f* are selected such that, the same joined width is obtained when joined with the arc plates 22*a* to 22*c*. Namely, the sum of the widths of the arc plate 32 and the arc plate 22 is a constant, and, therefore, when the width of the arc plate 32 increases, the width of the arc plate 22 decreases.

Also, a through hole 33 is bored at an end portion of each lid member 31 such that its corresponding pin 52*a* projecting from the end face of the wall 52 is inserted therein when the lid member 31 joins with the first cutting member 2. Accordingly, the closing position of the lid 31 is determined and precisely guided according to the position at which these through holes 33 are disposed and the position at which the pins 52*a* are formed. Also, as the pin 52*a* is inserted into the through hole 33, the lid 31 is prevented from fluctuating when the ribbon-coated multicore optical fiber 6 is separated by the separating apparatus 1, whereby the arc plates 22 of the first cutting member 2 and the arc plates 32 of the second cutting member 3 are prevented from shifting with respect to each other. Here, a pin may project from the lid 31 of the second cutting member 3, while a through hole for inserting this pin may be bored in the wall 52 which faces to the first cutting member 2. Further, magnets 34 and 52*b* having polarities different from each other are respectively buried in the end faces of each lid member 31 and wall 52, thereby allowing the lid 31 to maintain its closed position. Here, the lid 31 may also be precisely guided by engaging members other than pins and through holes.

On the other hand, the guide members 4 are respectively disposed at both ends of the through path for the ribbon-coated multicore optical fiber 6 formed by the first cutting member 2 and the second cutting member 3. Each of the guide members 4 is a part for positioning the ribbon-coated multicore optical fiber 6 inserted into this through path and is constituted by a guide body 41 and a guide lid 42. As shown in FIGS. 1 and 2, the guide body 41 is fixed to a side face of the substrate 21, while a slit 41*a* opens at an extension of the through paths 71 and 72 for the ribbon-coated multicore optical fiber 6. The slit 41*a* is a groove with an open side. For example, the side of the guide body 41 joining with the guide lid 42 is open such that the ribbon-coated multicore optical fiber 6 can be inserted into and taken out from this open portion. The opening of the slit 41*a* has a cross section substantially the same as that of the ribbon-coated multicore optical fiber 6 at the outer face position of the guide body 41, while only its size in the ribbon thickness direction is gradually divergent in the inner side (toward the arc plates 22 and 32). Because of this, the fiber path does not bend so sharp when slide substrate 21 moves downward.

On the other hand, the guide lids 42, each of which is a part for closing the open portion of the slit 41*a*, are respectively disposed outside of the lid members 31*a* and 31*f*. An end portion of the guide lid 42 is fixedly attached to the axial pin 51*d* so as to swing with the latter. Accordingly, when the ribbon-coated multicore optical fiber 6 to be separated is inserted into the through paths 71 and 72 and the slits 41*a*, the guide lids 42 can abut to the guide body 41, independently of each lid member 31. Therefore, even when each lid member 31 does not close the frame 5, the ribbon-coated multicore optical fiber 6 can be securely accommodated along the through path.

In the following, a method of using the separating apparatus for the ribbon-coated multicore optical fiber 6 will be explained.

First, a case where a ribbon-coated 16-core optical fiber 6 (ribbon-coated multicore optical fiber in which 16 coated optical fibers are arranged in parallel and ribbon-coated) is divided into four at once will be explained. In FIGS. 1 and 2, all of the lid members 31 and guide lids 42 are placed clear of the first cutting member 2 (frame 5). Then, the ribbon-coated multicore optical fiber 6 to be separated is inserted into thus opened through path 71 and slits 41*a*. Here, either end portion or middle portion of the ribbon-coated multicore optical fiber 6 may be inserted. After the ribbon-coated multicore optical fiber 6 is accurately inserted into the gaps between curved plates 22, the respective lid members 31 are successively closed, and the guide lids 42 are closed. When closing the lid 31, since each arc plate 32 of the second cutting member 3 abutting to the corresponding arc plate 22 of the first cutting member 2 is divided at the position where the through paths 71 and 72 are narrowest, each lid member 31 can be safely closed because it is visually confirmed that the ribbon-coated multicore optical fiber 6 is not jammed between the arc plates 22 and 32. Accordingly, the ribbon-coated multicore optical fiber 6 is prevented from being jammed and damaged between the arc plates 22 and 32. Also, when each lid member 31 joins with the frame 5, the pin 52*a* of the wall 52 is inserted into the through hole 33 of the lid member 31, whereby the lid member 31 is guided to its correct position. Further, as each guide lid 42 is closed, the ribbon-coated multicore optical fiber 6 within the through paths 71 and 72 is positioned at both ends thereof.

Figure 4:
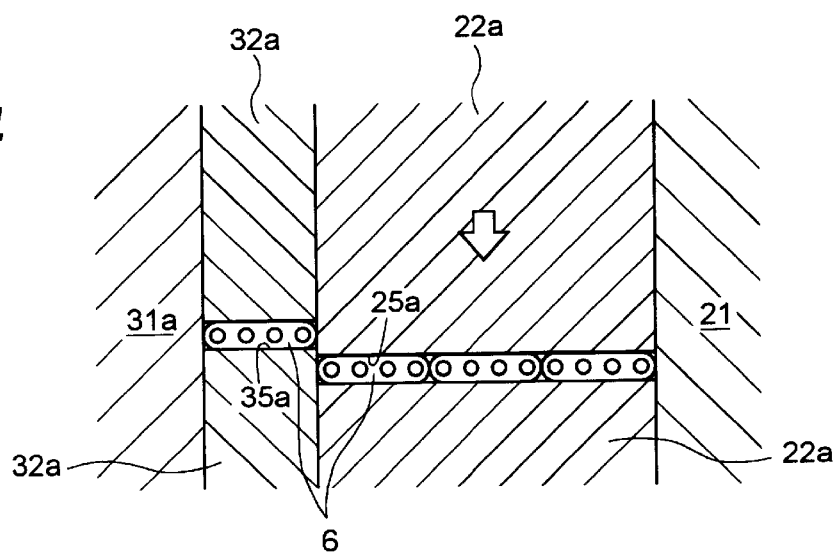
FIG. 4 is an explanatory view showing a separating process according to the apparatus for separating a ribbon-coated multicore optical fiber.
Figure 5:
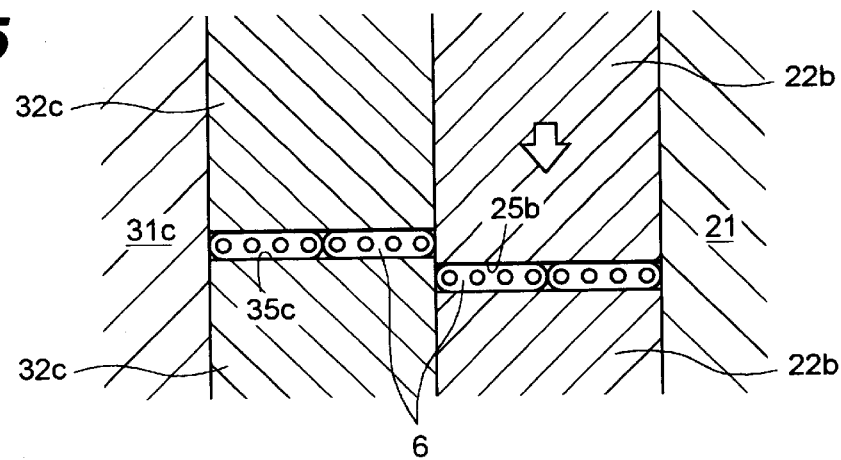
FIG. 5 is an explanatory view showing a separating process according to the apparatus for separating a ribbon-coated multicore optical fiber.
Figure 6:
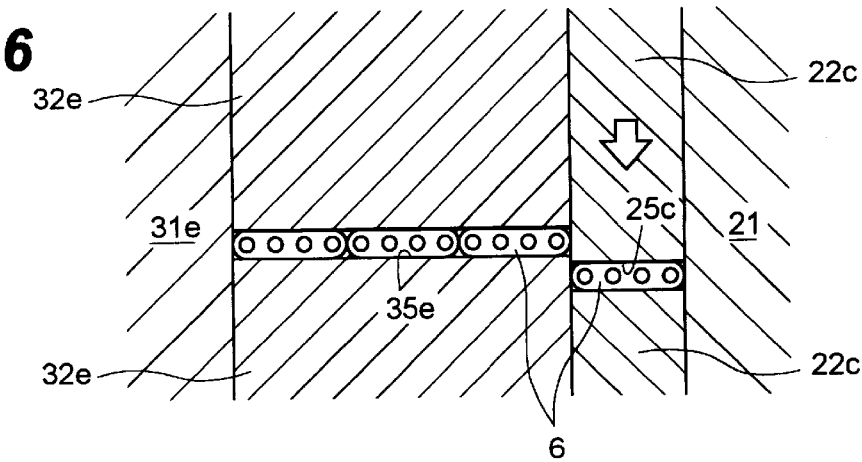
FIG. 6 is an explanatory view showing a separating process according to the apparatus for separating a ribbon-coated multicore optical fiber.

Then, in a state where all of the lid members 31 and guide lids 42 are closed, the button 24 is pushed into the frame 5. Due to this pushing operation, as shown in FIG. 3, the substrate 21 is moved toward the wall 51 by means of the stepped shaft 23, whereby all of the arc plates 22*a* to 22*c* in the first cutting member 2 move toward the wall 51. Accordingly, as shown in FIGS. 4 to 6, the arc faces 25a to 25c formed in the respective arc plates 22a to 22c gnaw into the ribbon-coated multicore optical fiber 6. As the arc face 25 on the pressing side moves to a position exceeding its opposed arc face 35, the ribbon-coated multicore optical fiber 6 is sheared. The shearing operations for the ribbon-coated multicore optical fiber 6 are simultaneously effected at the respective positions of the arc faces 25a to 25c. As the arc plates 22 formed with the arc faces 25 have different thickness values, the ribbon-coated multicore optical fiber 6 is sheared at different positions in its width direction and its longitudinal direction. For example, when the thickness values of the arc plates 22a, 22b, and 22c are respectively ¼, ²⁄₄, and ¾ of the width of the ribbon-coated multicore optical fiber 6, the latter is sheared at positions equally divided in its width direction. Accordingly, for example, a ribbon-coated 16-core optical fiber can be equally separated into four sub-ribbons, each containing four optical fibers.

Then, in a state where the button 24 has been pushed, while the ribbon-coated multicore optical fiber 6 extending from the separating apparatus 1 is kept straight, the separating apparatus 1 is caused to slide along the ribbon-coated multicore optical fiber 6. Consequently, each of the arc faces 25 and 35 shearing the ribbon-coated multicore optical fiber 6 moves along the latter, whereby each sheared portion of the ribbon-coated multicore optical fiber 6 is elongated along the ribbon-coated multicore optical fiber 6. Accordingly, the ribbon-coated multicore optical fiber 6 is separated into a plurality of strips in parallel to its longitudinal direction. Also, since the pin 52a is inserted into the through hole 33 when the separating apparatus 1 slides, the arc plates 32 in the second cutting member 3 are prevented from shifting from their corresponding arc plates 22 in the first cutting member 2, whereby the ribbon-coated multicore optical fiber 6 is separated precisely and securely. Here, this sliding operation may also be effected as the ribbon-coated multicore optical fiber 6 is moved, for example, such that the ribbon-coated multicore optical fiber 6 is pulled in a state where the button 24 of the separating apparatus 1 is pushed, while the separating apparatus 1 is fixed. Here, it is needless to mention that the ribbon-coated multicore optical fiber 6 to be separated by the separating apparatus 1 may also have a number of cores other than 16 as long as its width and the thickness of the curved plates correspond to each other.

In the following, another method of using the separating apparatus 1 for the ribbon-coated multicore optical fiber 6 will be explained. The above-mentioned separating apparatus 1 can also be used for separating the ribbon-coated multicore optical fiber 6 in a mode other than that for separating it into four sub ribbons. Namely, when shearing and sliding operations are effected while a few of the lid members 31 are open, the ribbon-coated multicore optical fiber 6 can be separated into two or three with a predetermined width. For example, after the ribbon-coated multicore optical fiber 6 to be separated is inserted into the through path 71 of the first cutting member 2 as shown in FIGS. 1 and 2, only the lid members 31a and 31b are closed, the other lid members 31c to 31f are opened, and the guide lids 42 are caused to join with the corresponding guide bodies 41. In this state, the button 24 is pushed to effect shearing, and the separating apparatus 1 is moved along the ribbon-coated multicore optical fiber 6. Then, in the state shown in FIG. 4, the ribbon-coated multicore optical fiber 6 can be separated such that the ribbon-coated 16-core optical fiber 6 is separated into a ribbon-coated 4-core optical fiber and a ribbon-coated 12-core optical fiber. Thus, since the respective lid members 31 and guide lids 42 are adapted to independently open and close, the mode of separation of the ribbon-coated multicore optical fiber 6 can be arbitrarily changed when selecting the open and close states of the lid members 31. Also, even in cases where the lid members 31a and 31f at both ends are open, the ribbon-coated multicore optical fiber 6 is positioned at least by means of the guide lids 42, 42 at two points. Accordingly, the separating positions can securely be prevented from shifting during a shearing or sliding operation. Here, the respective pairs of the lid members 31a and 31b, 31c and 31d, and 31e and 31f can form arcs functioning as shearing members only when their corresponding pairs of arc faces 35 become continuous. Accordingly, each pair of these lid members are used as being simultaneously closed.

Figures 7, 8:
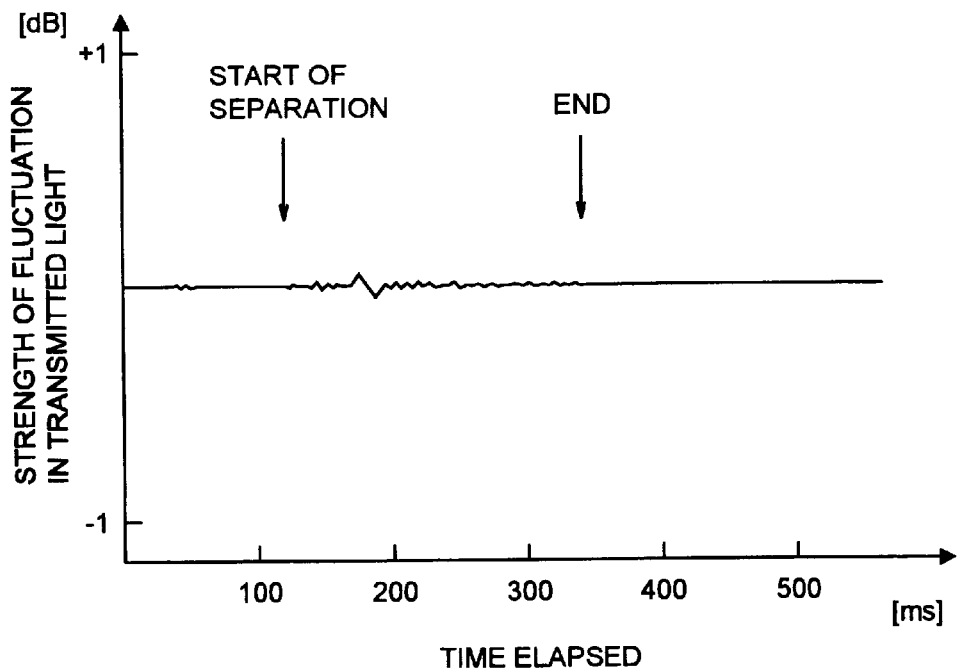
FIG. 7 is a chart showing states of separation according to the apparatus for separating a ribbon-coated multicore optical fiber.
FIG. 8 is a chart showing a light transmission characteristics during a separating process according to the apparatus for separating a ribbon-coated multicore optical fiber.

Also, assuming the lid members 31a and 31b to be A, the lid members 31c and 31d to be B, and the lid members 31e and 31f to be C in the separating apparatus 1, as shown in FIG. 7, there are 7 ($2^3-1$) combinations of open and close states of A to C excluding the state where all of A to C are open, whereby the ribbon-coated multicore optical fiber 6 can be separated in 7 modes. Accordingly, when the ribbon-coated multicore optical fiber 6 has 16 cores, it can be separated into any of 4, 8, and 12 cores. Thus, the single separating apparatus 1 can separate the ribbon-coated multicore optical fiber 6 into plurality of sub-ribbons in a single operation. Accordingly, it is excellent in utility.

In the following, a light transmission characteristic within the ribbon-coated multicore optical fiber 6 during a separating operation by means of the separating apparatus 1 will be explained.

The ribbon-coated multicore optical fiber 6 may be separated while the ribbon-coated multicore optical fiber 6 is active (where light is actually transmitted therethrough). Accordingly, it is required for the separating apparatus 1 to exert no influence upon the transmission characteristic of the ribbon-coated multicore optical fiber 6 during its separating operation. In the above-mentioned separating apparatus 1, when the ribbon-coated multicore optical fiber 6 is being separated, the mildly curved arc faces 25 and 35 abut to the ribbon-coated multicore optical fiber 6, without curving the ribbon-coated multicore optical fiber 6 in excess. Accordingly, there is hardly any influence on the transmission state of light before and after the operation for separating the ribbon-coated multicore optical fiber 6 by carefully designing its curvature of the plates e.g. larger than 30 mm in radius. Therefore, the separating apparatus 1 can be used for separating the ribbon-coated multicore optical fiber 6 online. FIG. 8 shows a transmission characteristic of the ribbon-coated multicore optical fiber 6 actually separated online by the separating apparatus 1. This transmission characteristic was obtained when, while light having a wavelength of 1.55 μm was transmitted through a fiber located near the position at which the ribbon-coated multicore optical fiber 6 was to be separated, received light levels before and after the separation were measured. According to the results of measurement, the influence due to the separating operation was 0.1 dB or less, which was not problematic at all when transmitting light signal.

EMBODIMENT 2

In the following, various kinds of other embodiments of the apparatus for separating a ribbon-coated multicore optical fiber will be explained.

In the above-mentioned separating apparatus 1 for a ribbon-coated multicore optical fiber, joining and separating means for the first cutting member 2 and second cutting member 3 may not be the frame 5 and lid members 31. Namely, the joining and separating means may have other configurations as long as the arc faces 25 of the first cutting member 2 and their corresponding arc faces 35 of the second cutting member 3 can be joined together and separated from each other thereby. In this case, effects similar to those of the separating apparatus 1 can be obtained as well.

Also, in the above-mentioned separating apparatus 1 for a ribbon-coated multicore optical fiber, the second cutting member 3 may move with respect to the first cutting member 2. In this case, effects similar to those of the separating apparatus 1 can be obtained as well.

Further, in the above-mentioned separating apparatus for a ribbon-coated multicore optical fiber, the respective arc faces 25 and 35 of the first and second cutting member 2 and 3 may not oppose and come close to each other at three positions. Namely, these arc faces 25 and 35 may oppose and come close to each other at two or not less than four positions, thereby dividing the ribbon-coated multicore optical fiber 6 into three or not less than five. In these cases, effects similar to those of the separating apparatus 1 can be obtained as well.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 049361/1996 filed on Mar. 6, 1996 is hereby incorporated by reference.

What is claimed is:

1. An apparatus for separating a ribbon-coated multicore optical fiber in which a number of a single core optical fibers are arranged in parallel, comprising:
   an entrance guide for receiving said ribbon-coated multicore optical fiber;
   an exit guide for discharging the separated ribbon-coated multicore optical fiber from said apparatus;
   a first set of members arranged between said entrance guide and said exit guide, said first set of members comprising:
      a first holding member, and
      a first moveable member,
   said first holding member comprising a pair of first curved faces opposing and spaced from each other and defining a first path parallel to a first direction extending from said entrance guide to said exit guide, said first movable member comprising a pair of second curved faces opposing and spaced from each other and defining a second path parallel to said first direction, said first holding member and said first movable member being arranged adjacent to each other along a second direction perpendicular to said first direction so that said first and second paths are aligned with each other and said ribbon-coated optical fiber is passed along said first and second paths;
   a second set of members arranged between said first set of members and said exit guide, said second set of members comprising:
      a second holding member, and
      a second movable member,
   said second holding member comprising a pair of third curved faces opposing and spaced from each other and defining a third path parallel to said first direction, said second movable member comprising a pair of fourth curved faces opposing and spaced from each other and defining a fourth path parallel to said first direction, said second holding member and said second movable member being arranged adjacent to each other along said second direction, said first and second sets of members being arranged along said first direction so that said first, second, third, and fourth paths are aligned with each other and said ribbon-coated multicore optical fiber is passed along said first, second, third and fourth paths; and
   a moving mechanism interconnected to the first movable member and the second movable member for simultaneously and integrally sliding said first movable member and said second movable member in a third direction perpendicular to each of said first and second directions to separate said ribbon-coated multicore optical fiber along said first direction,
   wherein said first movable member extends to a first position along said second direction with respect to said first path such that an edge of said first movable member is aligned with a first portion of said ribbon-coated optical fiber when said ribbon-coated multicore optical fiber is inserted into said first path, and wherein said second movable member extends to a second position along said second direction with respect to said second path such than an edge of said second movable member is aligned with a second portion of said ribbon-coated multicore optical fiber when said ribbon-coated multicore optical fiber is inserted into said second path, said first position being spaced from said second position along said second direction whereby said ribbon-coated multicore optical fiber is separated into at least three parts.

2. An apparatus according to claim 1, wherein the first and third paths define a path through which a part of the ribbon-coated multicore optical fiber is fed from said entrance guide to said exit guide.

3. An apparatus according to claim 2, wherein the second and fourth paths define a path through which a part of the ribbon-coated multicore optical fiber is fed from said entrance guide to said exit guide.

4. An apparatus according to claim 1, wherein each of said entrance and exit guides defines a slit and has a guide lid for closing one side of said slit, wherein each slit has a substantially rectangular cross section for receiving the ribbon-coated multicore optical fiber.

5. An apparatus according to claim 4, wherein said guide lid opens and closes the one side of said slit independently of movement of said first and second cutting members.

6. An apparatus according to claim 1, wherein said first moveable member and said second movable member are slidably arranged in the third direction.

7. An apparatus according to claim 1, wherein at least one of said first holding member and said second holding member is pivotally arranged to expose at least one of said second path and said fourth path.

8. An apparatus according to claim 1, wherein said first to fourth curved faces are arc faces.

9. An apparatus according to claim 1, wherein the radius of curvature of any one of the first second, third and fourth curved faces is 30 mm or more.

10. An apparatus for separating a ribbon-coated multicore optical fiber having a number of single-core optical fibers arranged in parallel, said apparatus comprising:
   an entrance guide for receiving the ribbon-coated multicore optical fiber;

an exit guide for discharging the separated ribbon-coated multicore optical fiber from said apparatus, a fiber moving path being defined from the entrance guide to the exit guide;

a first cutting member arranged between the entrance guide and said exit guide, comprising:
- a first movable member having a pair of first curved faces which are opposed to each other in a first direction, and
- a second movable member having a pair of second curved faces which are opposed to each other in the first direction,
- wherein the first movable member and the second movable member are arranged adjacent to each other in a second direction along the fiber moving path perpendicular to the first direction;

a second cutting member, comprising:
- a first holding member having a pair of third curved faces which are opposed to each other in the first direction, and
- a second holding member having a pair of fourth curved faces which are opposed to each other in the first direction, the first holding member and the second holding member being arranged adjacent to each other in the second direction; and a moving mechanism interconnected to the first movable member and the second movable member for simultaneously sliding the first movable member and the second movable member in the first direction to separate the ribbon-coated multicore optical fiber into a plurality of optical fibers;

wherein the first cutting member is arranged adjacent the second cutting member along a third direction such that the first movable member is aligned with the first holding member and such that the second movable member is aligned with the second holding member;

wherein the first movable member extends a first distance in the third direction with respect to the fiber moving path such that an edge of the first moveable member can be aligned with a first position of the ribbon-coated multicore optical fiber;

and wherein the second moveable member extends a second distance in the third direction with respect to the fiber moving path which is different from said first distance such that an edge of the second movable member can be aligned with a second position of the ribbon-coated multicore optical fiber.

11. An apparatus for separating a coated optical multi-fiber ribbon in which a number of single-core optical fibers are arranged in parallel, said apparatus comprising:

a frame having two ends;

a first cutting member held by said frame, said first cutting member having a pair of first curved faces and a pair of second curved faces,
- said pair of first curved faces being opposed to each other by way of a through path which is a space for inserting said coated optical multi-fiber ribbon, said pair of first curved faces being disposed in parallel along said through path, and being curved in a longitudinal direction of said through path,
- said pair of second curved faces being opposed to each other by way of said through path and disposed in parallel along said through path and being curved in the longitudinal direction of said through path,
- said first and second pairs of curved faces being disposed different positions along the longitudinal length of said through path and extending to positions different from each other with respect to a width direction of said through path;

a second cutting member held by said frame, said first cutting member being relatively moveable in a thickness direction of said through path with respect to said second cutting member; said second cutting member having a pair of third curved faces and a pair of fourth curved faces,
- said pair of third curved faces being opposed to each other by way of said through path and disposed adjacent with regard to said width direction of said through path to said first curved faces, such that movement of the first cutting member relative to the second cutting member causes shearing of said coated optical multi-fiber ribbon at a position intermediate to said first and said third curved faces,
- said pair of fourth curved faces being opposed to each other by way of said through path and disposed adjacent with regard to said width direction of said through path to said second curved faces, such that movement of the first cutting member relative to the second cutting member causes shearing of said coated optical multi-fiber ribbon at a position intermediate to said second and said fourth curved faces,
- said first cutting member being moveable in said thickness direction with respect to said second cutting member to effect shearing of said coated optical multi-fiber ribbon at the positions intermediate to the first and third as well as the second and fourth pairs of curved faces when said coated optical multi-fiber ribbon is inserted into said through path; and guide members respectively disposed at both ends of said frame in said longitudinal direction of said through path wherein said through path extends through said guide members.

12. An apparatus according to claim 11, wherein at least a first portion of said second cutting member is movable with respect to said first cutting member in said width direction whereby said first and third curved faces are moveable between a position in which said first and said third curved faces are adjacent to each other in said width direction of said through path and a position in which said first curved faces and said third curved faces separate from each other in said width direction of said through path.

13. An apparatus according to claim 12, wherein at least a second portion of said second cutting member is movable with respect to said first cutting member in said width direction whereby said second and fourth curved faces are moveable between a position in which said second and said fourth curved faces are adjacent to each other in said width direction of said through path and a position in which said second curved faces and fourth curved faces separate from each other in said width direction of said through path, said positions being attainable independently of the positions being attained by said first and said third curved faces.

14. An apparatus according to claim 11, wherein each of said guide members has a slit and a guide lid for closing one side of said slit, said slit forming an extension of said through path and having a substantially rectangular cross-sectional form for receiving said coated optical multi-fiber ribbon.

15. An apparatus according to claim 14, wherein said guide lid opens and closes the one side of said slit independently of movement of said first and said second cutting members.

16. An apparatus according to claim 11, wherein said first cutting member is moveably attached to said frame for said movement in the thickness direction of said through path.

17. An apparatus according to claim 11, wherein said second cutting member is swingingly attached to said frame, whereby said second cutting member respectively moves to positions adjacent to and away from said first cutting member as said second cutting member swings toward and away from said frame.

18. An apparatus according to claim 17, wherein a first engaging member is attached to one of said frame and said second cutting member while a second engaging member is attached to the other of said frame and said second cutting member, the position in which the first and the second cutting members are adjacent to each other being maintained as said first and second engaging members engage with each other.

19. An apparatus according to claim 18, wherein said first and second engaging members are respectively constituted by a pin and a hole into which said pin is inserted.

20. An apparatus according to claim 11, wherein said first to fourth curved faces are arc faces.

21. An apparatus according to claim 11, wherein the first curved faces and the third curved faces substantially form the same curves and also second curved faces and the fourth curved faces substantially form the same curves at an initial position.

22. An apparatus according to claim 11, wherein said third curved faces are opposed to each other by way of said through path and disposed adjacent with regard to said width direction of said through path to said first curved faces, and said fourth curved faces are opposed to each other by way of said through path and disposed adjacent with regard to said width direction of said through path to said second curved faces.

* * * * *